US 6,616,167 B2

(12) United States Patent
Guiet

(10) Patent No.: US 6,616,167 B2
(45) Date of Patent: Sep. 9, 2003

(54) TOWED IMPLEMENT

(75) Inventor: Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/982,414

(22) Filed: Oct. 18, 2001

(65) Prior Publication Data

US 2002/0050699 A1 May 2, 2002

(30) Foreign Application Priority Data

Oct. 26, 2000 (DE) .......................... 100 53 455

(51) Int. Cl.$^7$ ............................................. B60G 15/06
(52) U.S. Cl. ............................ 280/414.5; 280/124.158; 280/124.162; 172/669
(58) Field of Search ................. 280/414.5, 124.158, 280/124.162; 172/669

(56) References Cited

U.S. PATENT DOCUMENTS

| | | | | |
|---|---|---|---|---|
| 4,326,594 A | * | 4/1982 | Oka et al. ............... | 280/414.5 |
| 4,344,643 A | * | 8/1982 | Ray ...................... | 280/124.162 |
| 5,366,336 A | * | 11/1994 | Friesen et al. .......... | 280/414.5 |
| 6,164,683 A | * | 12/2000 | Kalman ................ | 280/124.162 |
| 2002/0056556 A1 | * | 5/2002 | Guiet ..................... | 172/669 |

FOREIGN PATENT DOCUMENTS

| DE | A1-31 39 936 | 4/1983 |
|---|---|---|
| EP | A1-0 149 870 | 7/1985 |

\* cited by examiner

Primary Examiner—Lesley D. Morris
Assistant Examiner—Matthew Luby

(57) ABSTRACT

A towed implement is provided with ground support wheels mounted to its chassis by trailing wheel support arms and respective suspensions including lift cylinders with which are associated damping devices that operate in such a way as to prevent damage to a respective cylinder from rebounding forces resulting when the suspension is being returned to its operating position by the release of energy stored in spring arrangements of the suspension after being loaded by an obstacle engaging the associated wheel. In one embodiment, the spring arrangement includes a damping spring located between an end of the associated cylinder and piston, and in another embodiment, the spring arrangement includes a gas pressure reservoir which, by virtue the operation of a reversing link in the suspension, is loaded both when the wheel is caused to move in a first direction by engaging an obstacle, and when the wheel is moved in the opposite direction by the airborne wheel once past the obstacle.

6 Claims, 3 Drawing Sheets

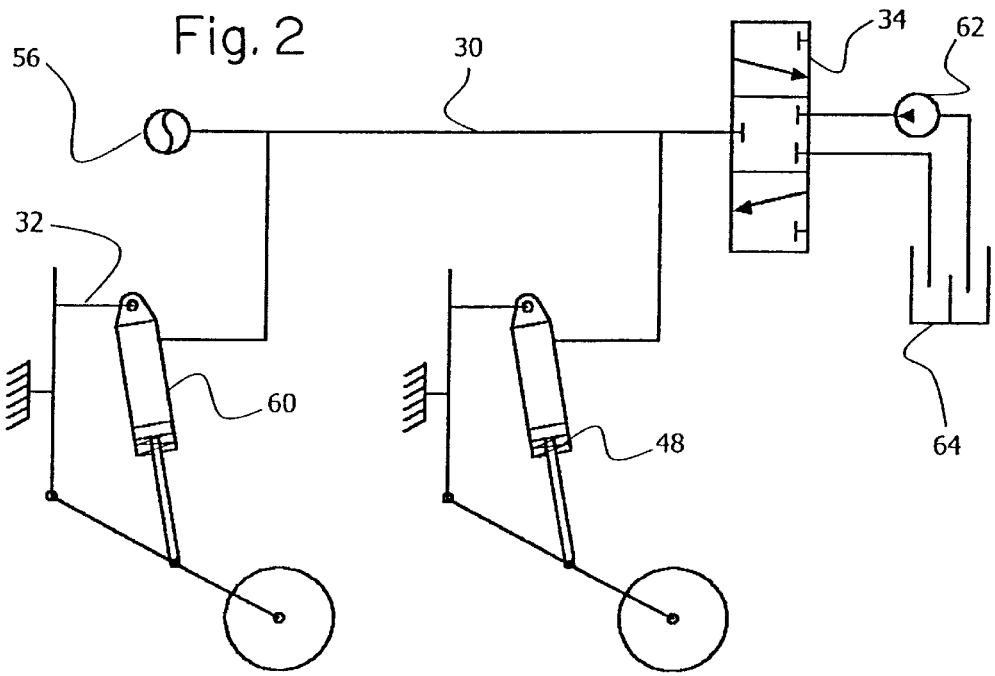
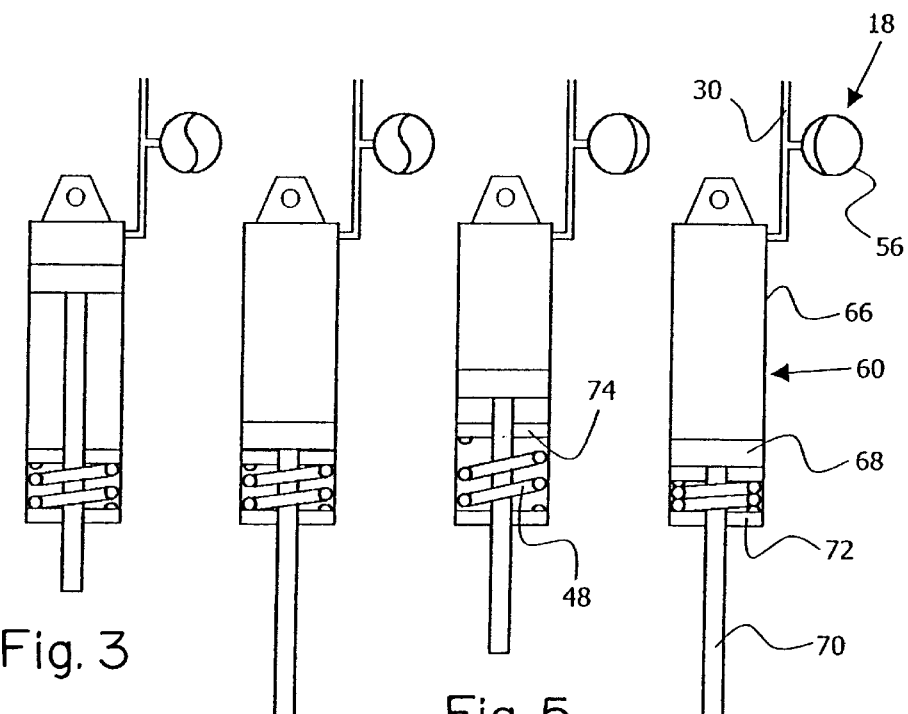

TOWED IMPLEMENT

FIELD OF THE INVENTION

The invention pertains to a towed implement with an undercarriage, at least one wheel suspension, a spring member and an adjusting device.

BACKGROUND OF THE INVENTION

DE-A-31 39 936 discloses a towed agricultural implement with an undercarriage, on the two lateral end regions of which one respective wheel suspension is arranged. Both wheel suspensions include a shaft in the region of their pivoting axis, and these shafts are connected such that they can be moved relative to one another by means of a spring-loaded, transverse swinging arm, namely on the ends that face one another. An adjusting device can be engaged with limit stops on the wheel suspensions in one direction in order to adjust the wheel suspensions in one direction.

EP-A1-0 149 870 discloses a towed mower in which an adjusting device and a spring member are connected in series. In one of the embodiments described in this publication, an adjusting cylinder acts upon a pivoted shaft that vertically pivots the wheel cranks on the respective end regions by means of braces in the form of gas springs formed by hydraulic cylinders coupled with gas accumulators.

The known suspension arrangements exhibit a problem which occurs when the mower encounters an obstacle, namely that the spring members need to absorb much energy and, after overcoming the obstacle, abruptly release the stored energy in case of low counter forces, for example when the wheel raises off the ground. This can lead to damage to the adjusting device, wherein the piston may, in particular, impact on the end of the cylinder housing or an inside shoulder and/or undergo damage to the sliding surface or the seals.

SUMMARY OF THE INVENTION

According to the present invention there is provided an improved suspension arrangement for a towed implement.

An object of the invention is to provide a suspension arrangement for a towed implement wherein provision is made for damping the rebound of the stored energy so as to prevent damage to the hydraulic or pneumatic actuators.

A more specific object of the invention is to provide a suspension for a towed implement including damping arrangements using coil or disc springs, gas pressure reservoirs or rubber-like elements.

Yet a more specific object is to provide a suspension, as set forth in the foregoing objects, wherein the damping arrangements may include devices that are relatively inexpensive and readily available on the market such as a coil spring or disk spring that is arranged around a piston rod in a cylinder housing, or a caoutachouc mass in the form of a ring or the like could be inserted between the end of the cylinder housing and the piston; and/or a gas pressure reservoir could be connected to a second piston chamber.

Yet another object of the invention is to provide a second embodiment wherein the wheel suspension includes a reversing link which operates when pivoted in a first direction to direct forces such that a gas spring accumulator that is coupled to a hydraulic cylinder connected to the reversing link acts so as to cushion loads caused when the wheel passes over an obstacle and, when pivoted in a second direction by the force of a suspended wheel returning to its operating position, also acts to cushion this movement of the wheel.

These and other objects will become apparent from a reading of the ensuing description together with the appended drawings.

BRIEF DESCRIPTION OF THE DRAWINGS

FIG. 2 is a schematic representation of an adjusting device with a spring member and a damping device constructed in accordance with the first embodiment of the invention.

FIGS. 3 through 6 are views of the adjusting device of FIG. 2 shown in respective first, second, third and fourth operating states.

DESCRIPTION OF THE PREFERRED EMBODIMENT

Figure 1:
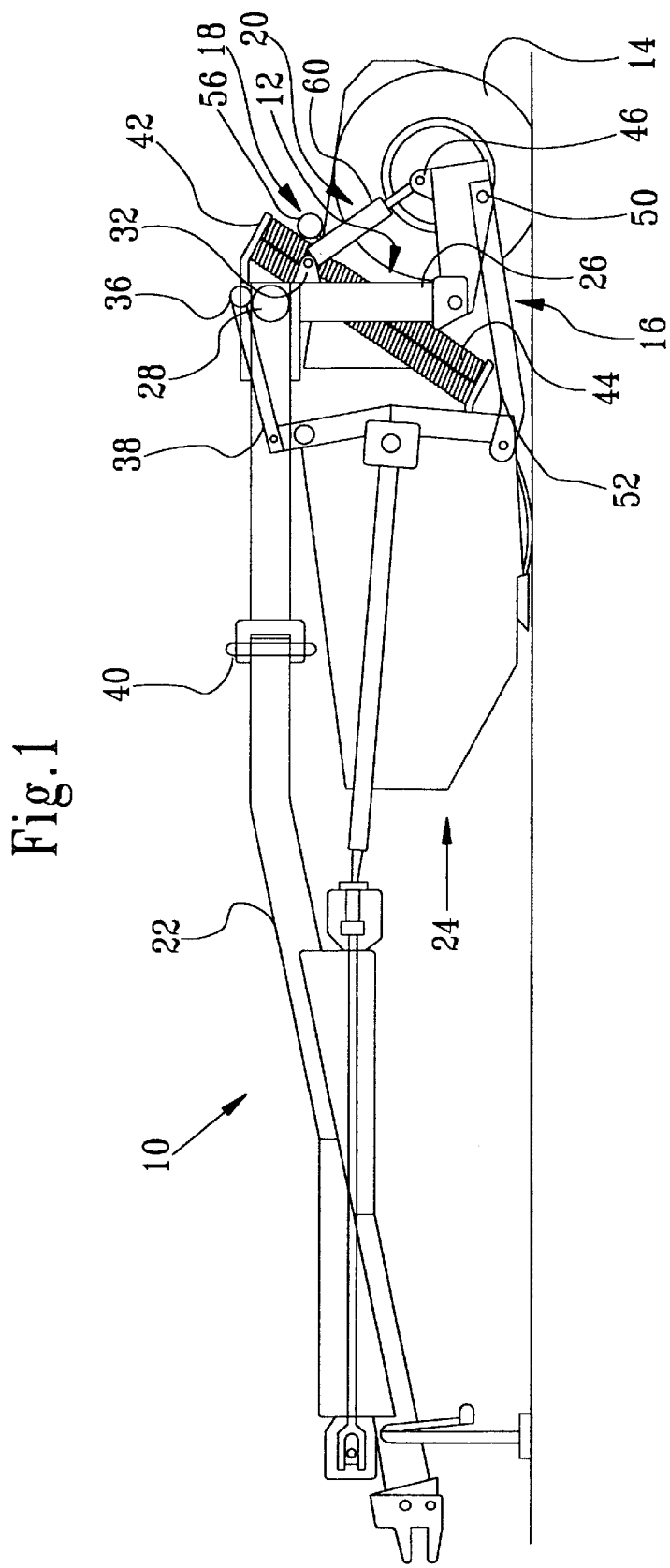
FIG. 1 is a schematic left side elevational view of a towed implement equipped with a suspension constructed in accordance with a first embodiment of the present invention.

The towed implement 10, shown in FIG. 1, includes an undercarriage 12, wheels 14, wheel suspensions 16, a spring arrangement 18, adjusting devices 20 and a working unit 24.

The implement 10 is constructed in the form of a mower-conditioner that serves for cutting, processing and depositing stalk crops on the ground. While in operation, the implement 10 is towed over uneven terrain with a relatively high speed and constantly subjected to shocks that, in addition to the flexibility of the wheels 14, need to be absorbed by the spring arrangement 18. However, the invention is by no means limited to an implement of this type, but can also be used in other towed implements, e.g., balers, soil conditioning tools, saws, sprayers and the like.

The undercarriage 12 is essentially constructed in the form of a frame that has the shape of an upside-down "U" with vertical limbs 26 and a horizontal crossbeam 28, in the intermediate space of which the working unit 24 is at least partially accommodated. The undercarriage 12 carries the working unit 24 in a fashion described in greater detail below, and together with the working unit can be adjusted to different elevations in reference to the ground.

A wheel 14, that is conventionally provided with a pneumatic tire, is connected in the lower region of each limb 26, such that it can be vertically pivoted, namely by means of the wheel suspension 16, which includes a trailing link having its forward end pivotally coupled to the limb 26 and carrying at its rear end a spindle on which the wheel 14 is rotatably mounted. Thus, the undercarriage 12 is supported on the ground by the wheels 14.

A holder or bracket 32 is situated in the upper region of each limb 26. In addition, a bearing 36 located in a rear region of an upper longitudinally extending arm 38 forms part of a pivotal coupling of the arm 38 to the crossbeam 28. Further, a bearing 40 forms part of a vertical pivotal axis about which a forward section of the tongue 22 is connected for pivoting horizontal relative to a rear section that is fixed to the cross beam 28. Receivers 42 for springs 44 are also provided on each side of the crossbeam 28.

Each wheel suspension 16 further includes a connection or bracket 46 located at the upper rear portion of the trailing link, and extending between the brackets 32 and 46 is an extensible and retractable motor 60 of the adjusting device 20. The motor 60, which is constructed in the form of a single-action hydraulic motor that is pressurized to effect its extension, can also be considered to form part of the wheel suspension 16. A lower suspension link 52 cooperates with the upper link 38 to form a four-bar linkage and has its rear end coupled to the trailing link by a pivot pin 50, and has its forward end coupled to a lower rear region of the working unit 24.

The spring member arrangement 18 includes a gas pressure reservoir 56 that acts as a spring element. Although the gas pressure reservoir 56 is common to both motor operators 60 forming part of the adjusting device 20 in FIG. 2, it would also be conceivable to provide a gas pressure reservoir 56 for each of the motor operators 60. The gas pressure reservoir 56 is connected to a shared supply line 30 for both motor operators 60 which ends in a generally known three position, three way hydraulic valve 34 and makes it possible to receive the pressure medium from a pump 62 or to release a pressure medium into a reservoir 64 by means of this hydraulic valve 34. The hydraulic valve 34, the pump 62 and the reservoir 64 are schematically shown in FIG. 2, for simplicity, with it to be understood that they replace a generally known hydraulic system that, however, is significantly more complicated to realize. The control of the motor operators 60 is accomplished remotely from the towing vehicle (not shown). The gas pressure reservoir 56 has such dimensions that its gas cushion is not compressed when the motor operator 60 is extended, and is subjected to the system pressure. The gas cushion is only compressed when the implement 10 more or less abruptly encounters an obstacle and the motor operators 60 are subjected to shocks.

Referring now also to FIGS. 3–6, it can be seen that a damping device 48 is incorporated in each of the operators 60. Specifically, each operator 60 includes a cylinder housing 66 and a piston 68 with a piston rod 70 which is able to slide in the cylinder housing 66. One end of the cylinder housing 66 is closed and connected to a supply line 30, wherein the other end of the cylinder housing is closed by a plate 72, through which the piston rod 70 extends. The cylinder housing 66 is connected to the undercarriage 12 in a pivoted fashion by the holder 32. Except for the supply line 30, no other hydraulic fluid connections are provided.

The damping device 48 is constructed in the form of a simple helical compression spring that is situated in the piston rod chamber of the cylinder housing 66 between the piston 68 and the plate 72 and surrounds the piston rod 70 with a certain amount of play. An annular disc 74 is arranged on the damping device 48, namely on its side that faces the piston 68. This annular disk 74 serves for achieving a superior contact between the damping device 48 and the piston 68 and contains a not-shown seal on its outer circumference which decelerates its movement along the inner wall of the cylinder housing 66 and thus prevents the damping device 48 from moving freely and developing undesirable noises. However, the annular disk 74 is not absolutely imperative for the function of the damping device 48 and can also be omitted.

FIGS. 3–6 respectively illustrate different operating states of the implement. Specifically, in FIG. 3, the state shown is that which occurs in the mowing mode, i.e., the motor operators 60 are retracted, the gas pressure reservoir 56 assumes a neutral position and the damping device 48 is not stressed. FIG. 4 shows the state in which the motor operators 60 are extended in order to raise the implement 10 into its transport position. The piston 68 contacts the damping device 48 such that its stroke is stopped. In FIG. 5, the situation shown is that which occurs when the implement 10 moves over an obstacle and the wheel suspension 16 is subjected to a shock that cannot be absorbed solely by the pneumatic tires of the wheels 14. In this case, the wheel 14 becomes airborne and the gas cushion in the gas pressure reservoir 56 is compressed and the piston 68 is able to move into the cylinder housing 66. Although this is not imperative, the stress on the damping device 48 can be relieved. The pressure in the motor operator 60 significantly increases above the system pressure. Once the obstacle has been passed over, the state becomes that shown in FIG. 6 wherein the motor operator 60 is once again extended while being subjected to a less intense stress because the wheel 14 in question does not contact the ground. Since the gas pressure reservoir 56 is now able to abruptly release and may even generate an internal vacuum, the piston 68 impacts on the damping device 48 and is decelerated. This damping prevents the plate 72 from being damaged.

Figure 7:
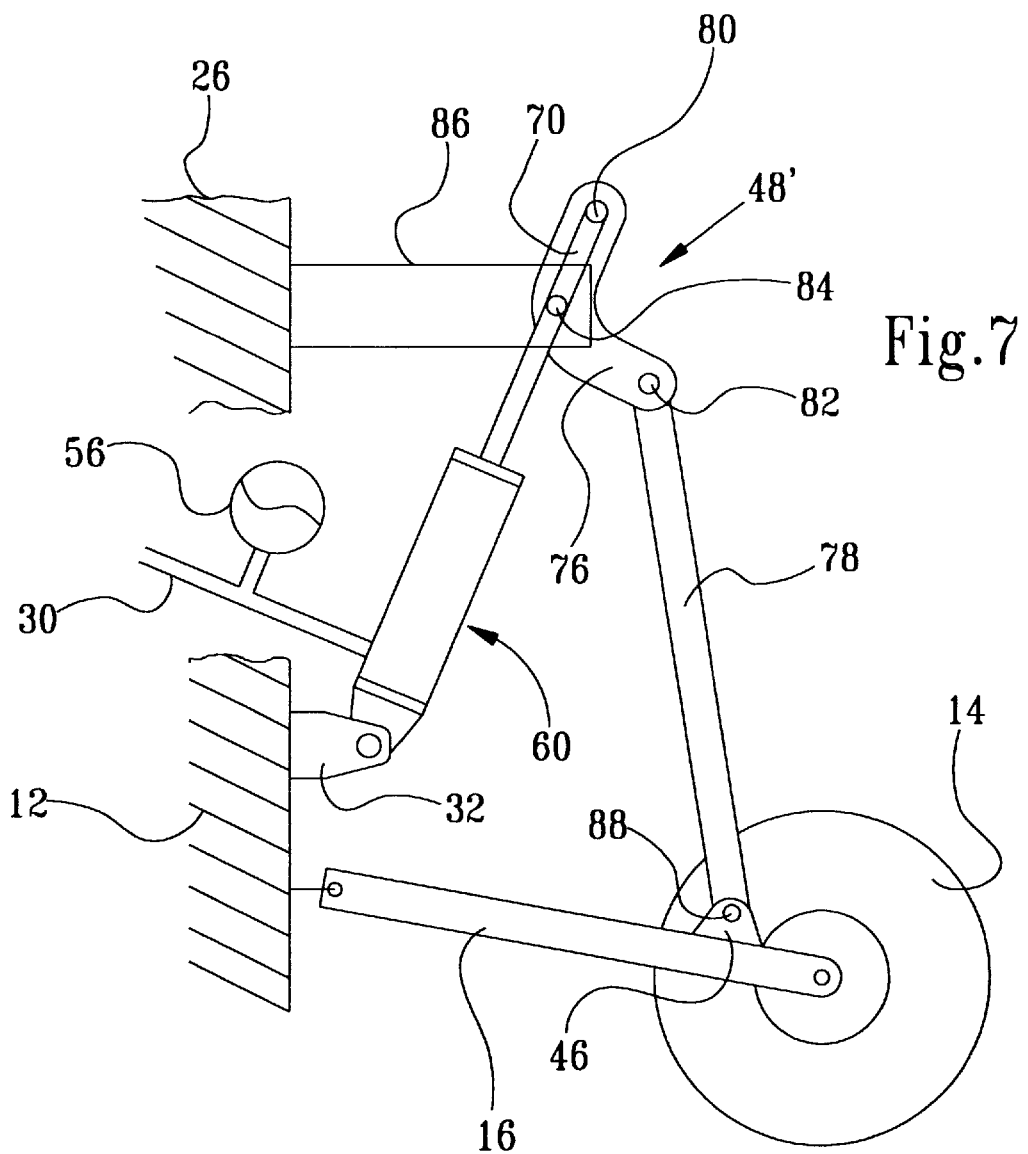
FIG. 7 is a schematic representation of a second embodiment of the adjusting device incorporating a reversing link together with a spring member and a damping device.

Referring now to FIG. 7, there is shown a second embodiment of the invention. Specifically, there is shown a damping device 48' that includes a reversing element 76, a brace or strut 78 and the gas pressure reservoir 56. This damping device 48' does not require a separate damping element, but rather is able to utilize the gas pressure reservoir 56 due to the change in direction caused by the reversing element 76. The motor operator 60 in this embodiment is also constructed in the form of a single-acting hydraulic cylinder, wherein the arrangement in this embodiment is chosen such that the end of the cylinder housing 66 is situated on the bottom and the piston rod 70 extends upward. However, this is not absolutely imperative for the invention. The bracket 32 is situated in the lower end region of the limb 26 in this embodiment. Although only one motor operator 60 and only one bracket 32 are illustrated, these components are actually provided on both sides.

The reversing element 76 is constructed in the form of an essentially L-shaped or V-shaped, pivoted arm with two limbs, with an end of one limb containing a bearing 80 connected to the piston rod 70, with the second limb having an end containing a bearing 82 connected to an upper end of the brace 78, and with a bearing 84 located in the reversing element 76 between the bearings 80 and 82 and connecting the reversing element 76 to a holder or bracket 86 constructed of a single member or parallel, fork-like members fixed to the undercarriage 12 or its limb 26, respectively. If a straight line is drawn through the bearings 80 and 82, the bearing 84 is always situated laterally of this straight line, namely on the side that faces the motor operator 60.

The brace or strut 78 extends between a bearing 88 on the bracket 46 in the upper rear region of the wheel suspension 16 and the bearing 82 on the reversing element 76. The brace 78 may even be provided with a spring in order to additionally dampen shocks.

The function of the embodiment shown in FIG. 7 is as follows. Specifically, the undercarriage 12 is supported on the ground by the wheels 14, wherein an essentially rigid connection that contains the motor operator 60 arranged in a pivoted fashion on the limb 26, the reversing element 76, the brace or strut 78 and the wheel suspension 16 counteracts a downward movement of the undercarriage.

Leaving aside the elasticity that is inherent to each component, only the gas pressure reservoir 56 performs a spring function. This means that the gas cushion of the gas pressure reservoir 56 is more or less compressed when the wheels 14 move over a rock or similar uneven terrain or obstacle. In such instances, the wheel suspension 16, according to FIG. 7, is pivoted in the counterclockwise direction, the strut 78 is raised and the reversing element 76 is also pivoted about the bearing 84 in the counterclockwise direction. Due to this pivoting movement, the piston rod 70 presses into the cylinder housing 66 and compresses the gas cushion in the gas pressure reservoir 56.

As soon as the obstacle is passed over and the force acting upon wheel suspension 16 decreases such that the gas pressure reservoir 56 is able to release, the compressed gas extends the piston rod 70 and the reversing element 76 is pivoted in the clockwise direction until the central longitudinal axis of the piston rod 70 and a line drawn through the bearings 80, 84 are situated congruently or in alignment with each other. In this case, the piston 68 has not yet reached the plate 72 but is also prevented from additionally extending by being located on center with the pivot points established by the bearings 80 and 84. If the wheel 14 and the wheel suspension 16 are able to additionally pivot in the clockwise direction, e.g., because the wheel 14 "hangs in the air", the piston rod 70 with the bearing 80 is moved over center relative to the bearing 84 and now causes the piston rod 70 to be pressed inward against the pressure in the gas reservoir 56. This means that an additional downward movement is counteracted by a spring action. The distance of the bearing 80 from the bearings 82 and 84 can be chosen differently in order to vary the power transmitting ratio.

Having described the preferred embodiment, it will become apparent that various modifications can be made without departing from the scope of the invention as defined in the accompanying claims.

What is claimed is:

1. In a towed implement having an undercarriage supported on wheel arrangements coupled to opposite sides of the undercarriage by a wheel support arm pivotally coupled in a trailing fashion to said undercarriage, and a suspension arrangement operatively coupled between said undercarriage and each wheel support arm, the suspension including an extensible and retractable powered actuator having a cylinder and a piston rod coupled to a piston received in said cylinder for movement between first and second ends of said cylinder, and a spring arrangement including a gas pressure reservoir operatively coupled to said first end of said cylinder for resiliently resisting movement of said piston in said cylinder toward said first end of said cylinder and storing energy when said cylinder is moved toward said first end in response to an impact force input caused by said wheel engaging an obstacle such as to cause said wheel to become airborne, the improvement comprising: said spring arrangement further including a damping arrangement operating so as to resiliently resist movement of said piston toward said second end of said cylinder in response to a release of said stored energy when said wheel is off the ground and returning to ground contact.

2. The towed implement, as defined in claim 1, wherein said damping arrangement includes a damping device arranged between said piston and said second end of said cylinder.

3. The towed implement as defined in claim 2 wherein said damping device is a spring.

4. The towed implement as defined in claim 3 wherein said spring is a coil compression spring.

5. The towed implement as defined in claim 1 wherein each suspension includes a brace having an end pivotally couple to said wheel support arm; a reversing link pivotally couple to said undercarriage at a pivoting axis, and to said brace and said piston rod at respective first and second connection points so spaced from each other that, when said implement in normal operation with said wheels passing over even terrain said piston rod is located on a line of centers extending through said pivoting axis and said second connection point, and when one or the other of said wheels is passing over an obstacle or returning from an airborne excursion after engaging the obstacle, the piston associated with said wheel that has just passed over the obstacle will move only in a first direction in said cylinder against the resistance of said spring arrangement.

6. The implement as defined in claim 5 wherein said spring arrangement consists solely of a gas pressure reservoir connected to said cylinder.

\* \* \* \* \*